Dec. 15, 1959 H. L. WIRT 2,916,878
AIR-DIRECTING VANE STRUCTURE FOR FLUID FUEL COMBUSTOR
Filed April 3, 1958 2 Sheets-Sheet 1
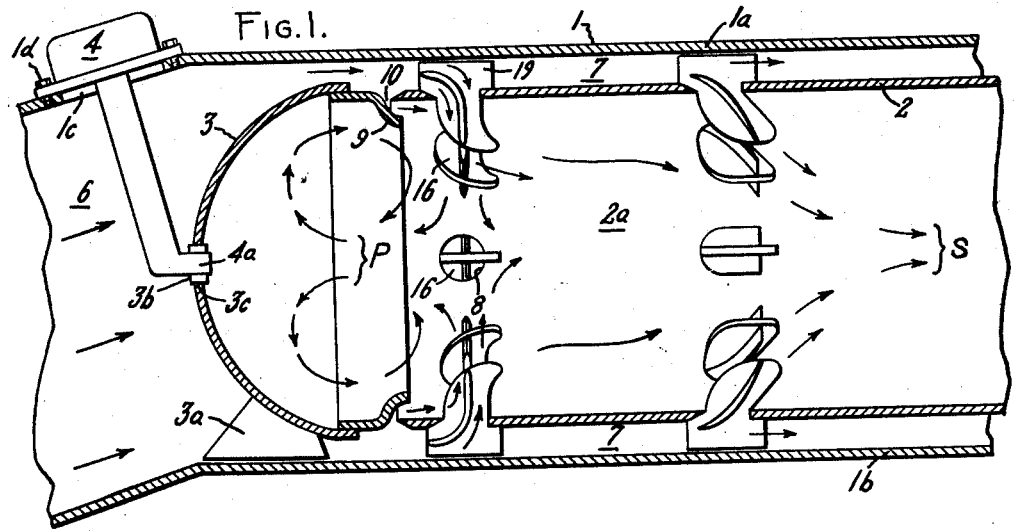
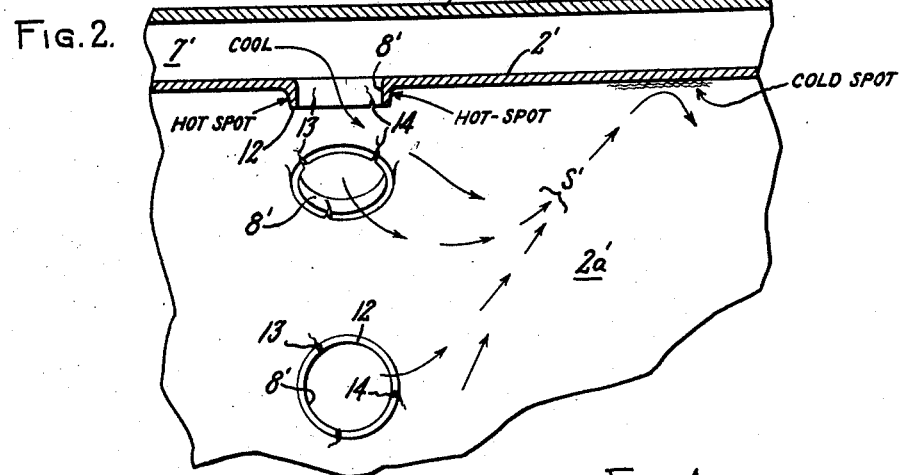
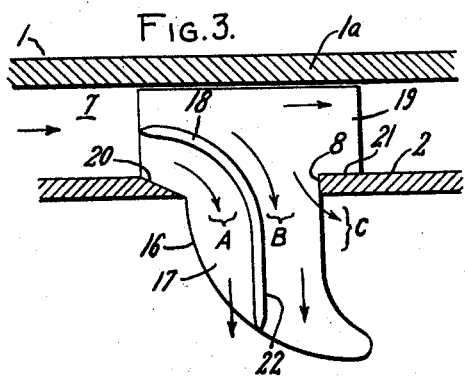
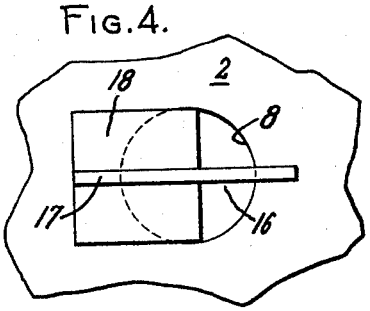
INVENTOR
HARRISON L. WIRT
BY
HIS ATTORNEY Dec. 15, 1959 H. L. WIRT 2,916,878
AIR-DIRECTING VANE STRUCTURE FOR FLUID FUEL COMBUSTOR
Filed April 3, 1958 2 Sheets-Sheet 2

INVENTOR
HARRISON L. WIRT
BY
HIS ATTORNEY

United States Patent Office 2,916,878
Patented Dec. 15, 1959

2,916,878

AIR-DIRECTING VANE STRUCTURE FOR FLUID FUEL COMBUSTOR

Harrison L. Wirt, Schenectady, N.Y., assignor to General Electric Company, a corporation of New York Application April 3, 1958, Serial No. 726,265

9 Claims. (Cl. 60—39.65)

This invention relates to fuel combustion systems or "combustors" for thermal powerplants, and more particularly to an air-directing vane structure for controlling and directing combustion-supporting air into the combustion space of such a combustor.

Although it may be applicable to combustors of annular or other configuration, the invention is particularly applicable to combustors of the so-called "Nerad type," disclosed in United States Patent No. 2,601,000 to Anthony J. Nerad, issued June 17, 1952, and assigned to the same assignee as the present application.

The Nerad type combustor comprises a substantially cylindrical outer casing with a substantially cylindrical combustion liner disposed therein and spaced from the inner wall of the casing to form an annular path for admission of combustion-supporting air under pressure. The liner forms part of the wall of the combustion space. The "upstream" end of the liner is closed by a "dome" member. The combustion air flows around the dome into the annular passage between the liner and the outer casing, and enters the combustion space through a plurality of combustion air inlet holes formed in the liner and variously arranged to produce strong jets of air which set up a desired flow pattern in the combustion space.

To this end, it is desirable and sometimes absolutely essential that the jets or streams of combustion air flowing into the liner through these air inlet holes be accurately directed at a pre-selected angle toward the longitudinal centerline, or axis of symmetry, of the liner. This is important in the Nerad combustor, in order that the air jet from each inlet hole properly meets the jets from other cooperating holes in the same circumferential row of holes. Impingement of these streams of air creates an "impact area" at the center of the liner which effects flow of the air longitudinally in the central portion of the combustion space. As noted more particularly in Nerad Patent 2,601,000, the air streams flowing through the first circumferential row of holes downstream from the end produce a reverse flow upstream toward the dome to form a toroidal flow of primary combustion air, producing initial combustion of the fuel injected into the combustion chamber through the dome. The products of initial combustion occurring near the dome then pass downstream between the jets of incoming primary air. Air entering the liner through the subsequent circumferential rows of holes comprises the "secondary" combustion air, completing the combustion of the products of initial combustion, and the "cooling and dilution air," reducing the hot combustion gases to a temperature suitable for the gas turbine.

If the strong jet of air from each combustion air inlet hole is directed accurately toward the centerline of the liner, so that it impinges on the jets from the other holes in the same circumferential row, the flow of hot gases in the combustion space will be as described in the Nerad Patent 2,601,000. However, if some of these jets deviate from the preselected intended direction, so that the jets in a given circumferential row do not impinge in a common impact area, the resulting longitudinal flow will deviate from being symmetrical about the axis of the liner, and will flow at an angle with the centerline so the hot core of gases will ultimately impinge on the inner wall of the liner. Contact of this hot core of combustion products with the walls of the liner creates "hot spots" and eventual failure of the liner due to perforation or "burn-out" at such points of impingement.

Poor aim of the streams of air flowing into the liner through the air inlet holes prevents formation of the desired symmetrical flow path in the combustion space, with the deleterious effects noted above. Poor aim can be caused by several factors, but the principal one in prior art constructions has been the lack of adequate means for guiding the air streams in the desired direction. This factor is aggravated because the combustion air flow approaching the annular passage surrounding the liner often has a variable angle of approach and perhaps a component of velocity tangential to the liner, so that the combustion air jets tend to enter the liner in directions askew to the centerline. Other factors tending to cause poor aim include: turbulence in the air flow caused by its passage around cross-fire tubes, which customarily pass transversely through the annular passage between the liner and the outer casing to connect the liner with adjacent combustors; turbulence produced by support struts or other structures in the air passages; but perhaps most of all by non-symmetrical angle of approach to the dome and annular air supply space around the liner.

Attempts have previously been made to overcome these problems by the use of a "thimbled" combustion air hole, which comprises a ring formed around the combustion air hole interiorly of the liner and forming a nozzle directed radially inwardly toward the centerline of the liner. It was the purpose of this structure to insure uniform direction of the combustion air toward a predetermined location on the centerline of the liner. However, it has been found that these thimbles are not completely effective, and also are short-lived. The inrushing air acts on the projecting thimble to produce a stagnant zone at the downstream side of the thimble, which acts as a "flame-holder" and collects unburned carbon, resulting in "hot spots" which ultimately fail.

Accordingly, it is an object of this invention to provide an improved vane structure which directs combustion air through air-supply holes toward a preselected location on the longitudinal centerline of a combustion liner with regularity and without deviation.

Another object of the invention is to provide a combustion air-directing vane structure which will not suffer deleterious effects from the high temperatures of combustion gases passing through an associated combustion liner.

It is a further object of this invention to provide means for reducing combustion liner burn-outs or perforation failures caused by improper direction of streams of combustion air flowing through combustion holes into the liner.

Other objects and advantages will become apparent from the following description, taken in connection with the accompanying drawings in which:

Fig. 1 is a longitudinal sectional view of a Nerad-type fluid fuel combustor incorporating air-directing vane structures in accordance with the invention;

Fig. 2 is a detail sectional view illustrating certain troubles encountered with prior art structures;

Fig. 3 is a detail view of a single air-directing vane assembly;

Fig. 4 is a plan view of the assembly of Fig. 3; and

Figure 6:
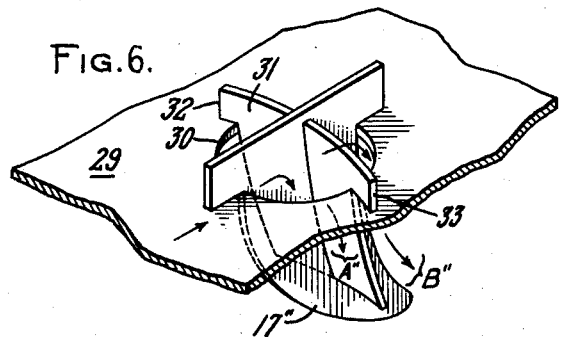
Figure 5:
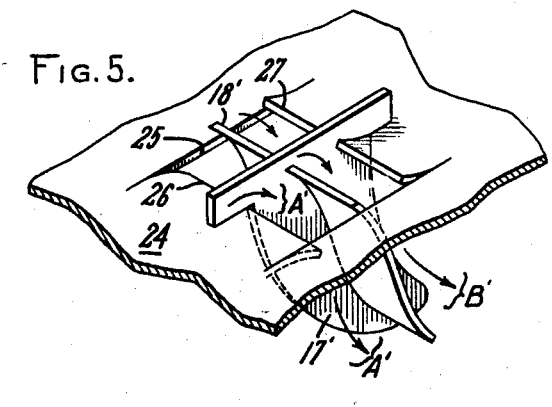
Figure 7:
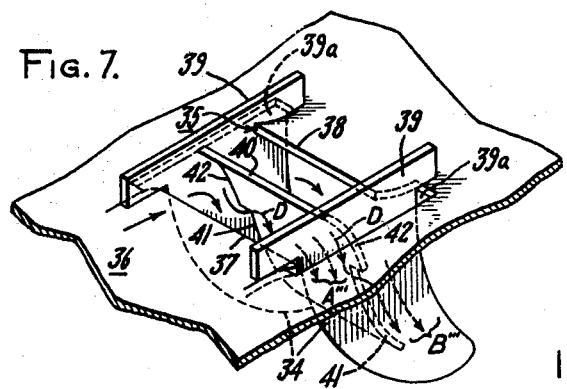

Figs. 5, 6, and 7 are perspective views of modified vane constructions embodying the invention.

Briefly stated, the invention comprises an air-directing vane assembly associated with a combustion air inlet port and including at least one curved vane for directing air from the supply passage into the combustion space at a preselected angle, with means for insuring that cool air flows over both surfaces of the vane to shield it from impingement of hot gases and from deposition of unburned fuel particles.

Referring now more particularly to Fig. 1, a substantially cylindrical outer casing of the combustor is generally designated 1. A cylindrical combustion liner 2, having a longitudinal axis of symmetry, extends longitudinally through a portion of the outer casing 1. A plurality of such combustors may be circumferentially spaced about the axis of rotation of a turbine to supply it with motive combustion products. As is well known in the art, the outer casing may alternatively be formed as an annulus coaxial with the axis of rotation of a turbine, such that casing 1 would be in the form of an annular member with walls mutually coaxial with the turbine. In such a construction, a plurality of cylindrical liners 2 might be circumferentially spaced about the axis of rotation of the turbine within the annular space enclosed by the outer casing. The invention is of course applicable to combustion systems of other configuration, for instance those in which the combustion space is a single annular chamber surrounded by inner and outer annular air supply passages.

The forward or upstream end of each liner 2 is substantially closed by a dome 3, the details of which may be as disclosed in the Nerad Patent 2,601,000, referred to previously. The liner and dome define and partially enclose a combustion space 2a. The dome and liner may be supported by any suitable means, such as a series of vanes 3a, of which only one is shown in the drawing as being welded to the dome and supported by the outer casing. A fuel nozzle body 4 of standard construction is secured to the outer casing 1a over a suitable opening 1c by means of machine screws 1d. A nozzle portion 4a of the nozzle body extends into the outer casing and through a bushing 3b seated in an opening 3c suitably formed in dome 3. An igniter of any suitable construction (not shown) is also mounted in dome 3 for igniting fuel injected by nozzle 4a.

Outer casing 1 defines and partially encloses an air passage 6, which receives air at a suitable pressure from a compressor (not shown). Liner 2 is positioned in spaced relation to casing 1a, 1b to define an annular air flow passage 7 therebetween. The flow of air supplied through passages 6, 7 is in the direction shown by the arrows, and it will be seen that the angle of approach is not symmetrical but forms an angle with the axis of the dome and liner. A small portion of the air enters dome 3 through suitable openings (not shown) to form a boundary layer of cooling air on the interior surfaces of the dome, as described in detail in the aforementioned patent to Nerad—2,601,000. The remainder of the air supplied through passage 6 flows into passage 7, and is admitted into combustion chamber 2a through a series of groups of circumferentially and longitudinally spaced holes 8 formed in the walls of liner 2.

Additionally, a very small portion of the air received in passage 7 is passed into combustion chamber 2a through cooling louvers of any suitable arrangement, represented in the drawings by an annular inlet nozzle 9 having an annular inlet 10 formed near the upstream end of the liner. This louver system forms a boundary layer of cooling air over the inner surface of the liner to keep the metal wall cool and prevent the deposition of unburned carbon. These cooling and insulating louver systems form no part of the present invention, being more fully described, for instance, in United States Patent No. 2,699,648 to D. C. Berkey, issued January 18, 1955, and in the Nerad Patent 2,601,000.

In accordance with the principle of operation of the "Nerad combustor," air admitted to combustion chamber 2a through holes 8 comprises both "dilution" air and air for primary and secondary combustion of fuel. As previously explained, and as shown by the arrows in Fig. 1, it is desirable that the flow from each of holes 8 in a given circumferential row should impinge to form an "impact area" at the axis of symmetry of the liner. When such an impact area is formed, the air from the streams moves in a direction along the centerline determined by the relative pressures upstream and downstream of the impact area. As has also been explained, it is found in practice that the air from the first circumferential row of holes passes upstream toward the dome, while, generally speaking, the air jets from the remaining circumferential rows of holes pass downstream. In Fig. 1, the air from only the first circumferential row of holes downstream of the dome is shown to pass upstream, as a flow of primary combustion air P. The air jets from the second circumferential row of holes downstream from the dome passes as a flow identified S, moving downstream along the centerline of the liner. This may be considered to represent secondary combustion and dilution air. Provided the gas flow occurs in the desired manner as shown by the arrows, the flow of primary air P will pass axially upstream towards dome 3, there producing the double opposed vortex flow or "tore" in which occurs the primary combustion of fuel injected by nozzle 4. The products of primary combustion then pass downstream, along the interior walls of the liner and between the jets of incoming air from holes 8. The flow of combustion products is then entrained by the flow S of secondary combustion air.

Fig. 2 shows what occurs with a type of "thimbled" air inlet port not employing the invention. Here the combustor includes a liner 2' and a casing 1a', the liner being formed with a circumferential row of thimbled combustion air holes 8'. The thimbled combustion holes are formed with inwardly protruding ring portions 12 for the purpose of directing the strong jets of air toward the centerline of liner 2'. A flow of relatively cooler air passes from passage 7' into combustion space 2a' through holes 8' in the indicated manner. Experience has shown that the ring portions 12 of the thimbled holes 8' tend to crack and burn very quickly in service. This is perhaps caused by thermal stresses set up by the flow of cool air through the inside of the ring and the flow of relatively hot combustion products impinging on the outside of the ring. As a result, one "hot spot" forms at the upstream side of the thimble. Another "hot spot" forms at the "leeward" or downstream side of the ring, caused by the burning of fuel deposited on the outer side of the ring by reverse flows and eddy currents. These hot spots tend to erode away the ring and form cracks as shown at 14, and eventually to cause a "burn-out" of the ring, and then of the liner.

It has also been found in practice that short nozzles like those shown at 8' do not accurately and uniformly direct the flow of air toward the centerline of the liner. A misdirected flow of the kind which commonly occurs in such a combustion chamber is shown by the arrows forming a flow of cool secondary combustion air S', by way of example. The direction of the flow S' resulting from these unsymmetrical jets is at an angle to the centerline, and consequently strikes the interior wall of liner 2', for instance in the manner shown, and forms a cold spot. The resulting unbalance of the flow in the combustion space results in "hot spots" at other places where the hot gases from the "core" of the combustion space impinge. This eventually leads to a "burn-out" or perforation at such a hot spot.

It will now be seen how the air-directing vane structures embodying the present invention prevent the problem described in connection with Fig. 2. The vane structures identified 16 in Fig. 1 direct incoming air uniformly and accurately in a predetermined direction into the combustion space, so as to form flows P and S in the desired manner.

Referring now to Figs. 3 and 4, a single air-directing vane structure 16 is shown in detail, comprising a vane 17 which may be referred to as a support or "steady vane," and a vane 18, which may be referred to as a "turning vane."

The steady vane 17 is substantially flat, and is positioned with its flat major surfaces lying substantially in a plane radial to the axis of liner 2. The steady vane is formed with a rectangular portion 19 for mounting the vane structure on liner 2 in a position extending across and with a depending portion projecting through hole 8. The rectangular portion is welded to the external surface of the liner along edges 20 and 21, to secure the vane structure in the desired position.

Turning vane 18 is disposed through a suitable slot 22 formed in steady vane 17, and welded or otherwise suitably secured therein. The turning vane is thus mounted with its major surfaces perpendicular to the major surfaces of the steady vane, and lying in planes transverse to the centerline of the combustion chamber. The turning vane serves to receive a portion of the air from supply passage 7 and to direct it in a predetermined direction toward the centerline of the liner, and its major surfaces are suitably curved for this purpose. The optimum shape may be determined experimentally, but should preferably be such as to maintain a laminar flow of the air streams passing over both of its surfaces.

Air received through hole 8 from passage 7 is divided by turning vane 18 into two flows A and B, which pass over its upstream and downstream surfaces, respectively. These flows are divided in equal parts by steady vane 17, which helps to direct them in planes radial to the centerline of the liner. By suitably selecting the shape of turning vane 18, the flows A and B are directed at a predetermined angle toward the axis of the liner.

It is important to note that with this arrangement the flows A and B serve to protect all major surfaces of the vane structure, including both the surfaces of the turning vane 18 and the steady vane 17, from the high temperatures of the hot gases in the combustion space. The good protection of these surfaces by the relatively cool flows A and B explains the absence of troubles due to burning, cracking, and corrosion exhibited by the air-directing vane structures of the prior art.

Thus it will be seen that the invention provides a "nozzle" which gives good control of the direction of the jet without using structure having surfaces contacted by the hot combustion gases.

The vane structure can of course assume many forms. One modification is shown in perspective in Fig. 5. In this form, a square combustion air hole 25 is employed, and is formed in a liner 24 with a downwardly turned lip 26 at the upstream end of the hole, and with an upwardly turned lip 27 at the downstream end of the hole. Lips 26 and 27 serve to assist the turning vane 18' in directing air flow through opening 25 in the desired direction and with a laminar flow characteristic. The vane structure is identical with that shown in Figs. 3 and 4, including a steady vane 17', and turning vane 18'. The flows A', B' set up by the vane structure are also similar.

A second modification of the invention is shown in Fig. 6. In this modification, a circular air hole 30 is formed in a liner 29. Hole 30 is fitted with a vane structure comprising a steady vane 17'' identical with the steady vane of the first two modifications, and with a turning vane 31 whose major surfaces are curved in two directions to form a spoon or tongue-shaped configuration. As noted before, the specific configuration of the turning vane 31 may be experimentally determined so as to improve the laminarity of the air flow passing through hole 30, and to minimize the diffusion of this air stream prior to its impingement upon air streams received from the other air holes of the same circumferential group. Turning vane 31 is formed with laterally projecting lips 32 and 33 for welding to the outer surface of liner 29, to more securely hold the vane structure in place within hole 30. Air flows A'', B'' are produced by this modified vane structure, as will be understood from the drawing.

In an additional modification shown in Fig. 7, a vane structure having two steady vanes 34 is employed, in combination with a generally rectangular opening 35 formed in a liner 36. Opening 35 has downwardly and upwardly turned lips 37 and 38 at its upstream and downstream edges, respectively. Steady vanes 34 are provided with rectangular portions 39 for mounting the vane structure on liner 36, in the manner previously described. The steady vanes are arranged in a parallel fashion at opposite sides of hole 35. Opening 35 is substantially identical with opening 25 employed in the modification shown in Fig. 5. A turning vane 40 is provided, which is similar to turning vane 18 of Figs. 3 and 4, except that cut-away portions 41 are formed in the lateral edges 42 thereof. Turning vane 40 is positioned centrally in opening 35 and welded or otherwise suitably secured along lateral edges 42, abutting the interior surfaces of steady vanes 34. Lips 37 and 38 serve to cooperate with the turning vane in establishing the desired laminarity of flow, as in the modification of Fig. 5. This modification produces flows A''', B''', similar to those of the previous modifications. The cut-away edge portions 41 permit flow D to occur from one side to the other of the turning vane, thus cooling the entire inner surface of the steady vane 34. The use of dual steady vanes in the construction of Fig. 7 further controls the direction of flows A''' and B'''.

It is to be noted further that the liner wall may be cut away slightly, as at 39a in Fig. 7, to permit some cooling flow on the outside surface of steady vane 34.

It may not be absolutely necessary in practicing the invention to employ both a steady vane and a turning vane but this is highly desirable to insure accurate control of the flows A and B. It is essential that at least one vane be located in the combustion air inlet hole in the wall of the liner, in such a manner that the cool incoming air flows over both surfaces of the vane, thereby protecting the vane from hot combustion products passing through the liner, while accurately imparting a desired direction to the jet of combustion air.

The use of van structures, as described herein, in a circumferential row of combustion holes of a Nerad-type liner insures the direction of the strong jets of air from each of the holes toward a common "impact zone" at the centerline. This results in proper impingement of the jets to produce uniform flow of hot gases along the axis of the liner and out of contact with the liner walls.

While several modifications have been disclosed herein, it will be understood that the invention is not limited to these specific details of construction, and still further changes and modifications will occur to those skilled in the art. It is of course intended to cover by the appended claims all such changes and modifications as fall within the true spirit and scope of the invention.

What I claim as new and desire to secure by Letters Patent of the United States is:

1. In a fuel combustor comprising a casing and a liner mounted in said casing in spaced relation therewith to form an air supply passage therebetween, said liner defining a plurality of spaced holes for admitting air from said passage into the combustion space defined within the liner, the combination of at least one air-directing vane structure comprising a first vane disposed generally parallel to the air flow in the air supply passage and having a portion extending across and projecting into the hole, and a second vane having portions projecting across the air hole normal to the respective sides of the first vane and including a first outer portion disposed in the air supply passage for directing a portion of the air flow through the portion of the hole upstream from the second vane, said second vane having a second inner portion projecting through the air hole inwardly into the combustion space, the downstream surface of said second portion being swept by air entering through the portion of the hole downstream from the second vane, whereby both surfaces of the second vane are shielded from contact with hot combustion products in the combustion space.

2. In a fuel combustor comprising a casing and a liner mounted in said casing in spaced relation therewith to form an air supply passage therebetween, said liner defining a plurality of spaced holes of generally rectangular configuration for admitting air from said passage into the combustion space defined within the liner, the combination of at least one air-directing vane structure comprising first and second substantially flat vanes having major surfaces which lie in mutually perpendicular planes, said second vane having a portion disposed across and projecting into one of said holes and mounted on the liner, the second vane being disposed to receive air through the upstream portion of the hole and discharge it in a preselected direction into the combustion space, the downstream portion of the hole serving to discharge relatively cool air over the downstream surface of the second vane whereby both surfaces of the second vane are shielded from contact with hot combustion products in the combustion space.

3. In a fuel combustor comprising a casing and a liner mounted in said casing in spaced relation therewith to form an air supply passage therebetween, said liner defining a plurality of spaced holes of a generally rectangular configuration for admitting air from said passage into the combustion space defined within the liner, the liner wall portion forming the upstream edge of each hole being curved inwardly into the combustion space and the downstream edge portion of each hole being curved outwardly into the air supply passage, the combination of at least one air-directing vane structure comprising a vane with a portion disposed across and projecting into one of said holes and mounted on the liner, said vane being disposed to receive air through the upstream portion of the hole and discharge it in a preselected direction into the combustion space, the downstream portion of the hole serving to discharge relatively cool air over the downstream surface of the vane, whereby both surfaces of the vane are shielded from contact with hot combustion products in the combustion space.

4. In a fuel combustor comprising a casing and a liner mounted in said casing in spaced relation therewith to form an air supply passage therebetween, said liner defining a plurality of spaced holes for admitting air from said passage into the combustion space defined within the liner, the combination of at least one air-directing vane structure comprising a first curved vane disposed substantially across the middle of the air hole and normal to the direction of approach of the air in the supply passage, and second and third generally flat vanes disposed at either side of the air inlet hole and generally parallel to the direction of approach of the air in the supply passage, said second and third vanes having radially outer portions supported on the outer surface of the liner and radially inner portions projecting through the air inlet hole into the combustion space, said first curved vane having radially outer portions at either side of the air hole secured to said respective second and third vanes and a radially inner portion projecting into the combustion space.

5. A combustor with air-directing vane structure in accordance with claim 4 in which the liner wall defines cooling air slots adjacent the outer surfaces of the second and third vanes, respectively, for projecting streams of cooling and insulating air over the outer surface of the portion of said vanes disposed within the combustion space.

6. A combustor having air-directing vane structure in accordance with claim 4 in which the side edge portions of the radially inner portions of the curved vane define cooling slots with the adjacent surfaces of the second and third vanes, respectively, whereby substantially all surfaces of the inner portion of the first vane disposed within the combustion space are swept by comparatively cool air entering through the air inlet hole.

7. For use in a fuel combustor including a casing, a substantially cylindrical liner defining a combustion space, said liner being disposed in said casing in spaced relation therewith to form a supply passage for air therebetween, the liner having at least one circumferential row of spaced holes for admitting air to said combustion space, a plurality of air-directing vane structures, each disposed in one of said air inlet holes, each vane structure comprising at least one substantially flat vane extending generally parallel to the air flow in said supply passage, and at least one curved vane disposed transversely to said air flow, the curved vane being secured to at least one side of the flat vane and disposed normal thereto across the mid-portion of the air inlet hole, whereby the upstream surface of the curved vane directs a portion of the air from said supply passage into the combustion space and air entering the combustion space through the portion of the hole downstream from the curved vane sweeps the downstream surface of said vane to prevent contact by hot combustion gases.

8. A combustor with air-directing vane structures in accordance with claim 7, in which each of the vane structures comprises two transversely spaced parallel flat vanes disposed at either side of the air inlet hole, and a curved vane formed with parallel side edges, the curved vane being supported between the spaced flat vanes with at least portions of said parallel side edges abutting adjacent surfaces of the flat vanes.

9. The combination recited in claim 8, in which the curved vane is formed with cut-away portions along the parallel side edges, to form passages for cross-flow of air from the upstream surface of the curved vane over the entire adjacent surface of the abutting flat vane.

References Cited in the file of this patent

UNITED STATES PATENTS

| | | |
|---|---|---|
| 2,398,654 | Lubbock | Apr. 16, 1946 |
| 2,531,810 | Fyffe | Nov. 28, 1950 |
| 2,770,096 | Fox | Nov. 13, 1956 |
| 2,830,439 | Johnson | Apr. 15, 1958 |